(No Model.)
C. C. LOVEJOY.
CHECK HOOK.
No. 390,380. Patented Oct. 2, 1888.
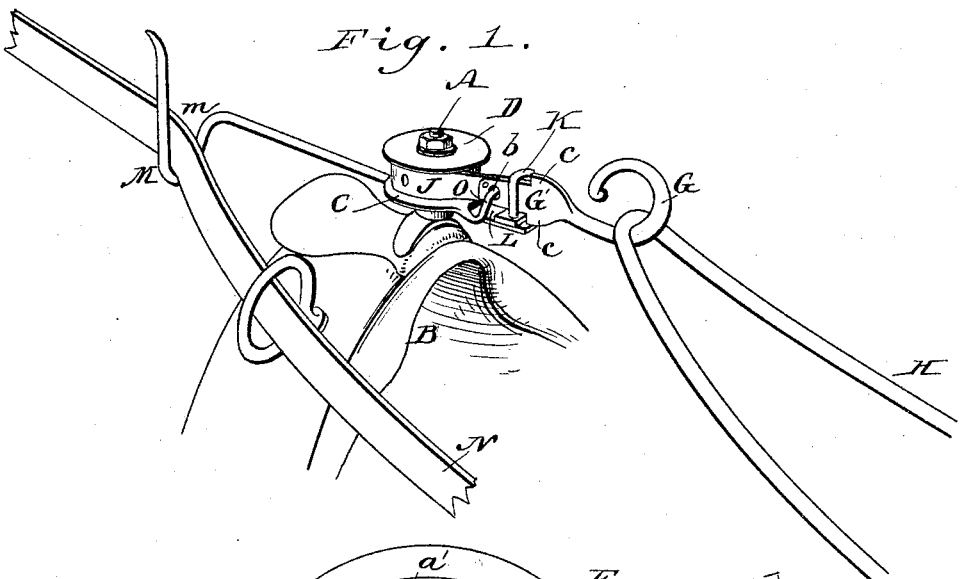
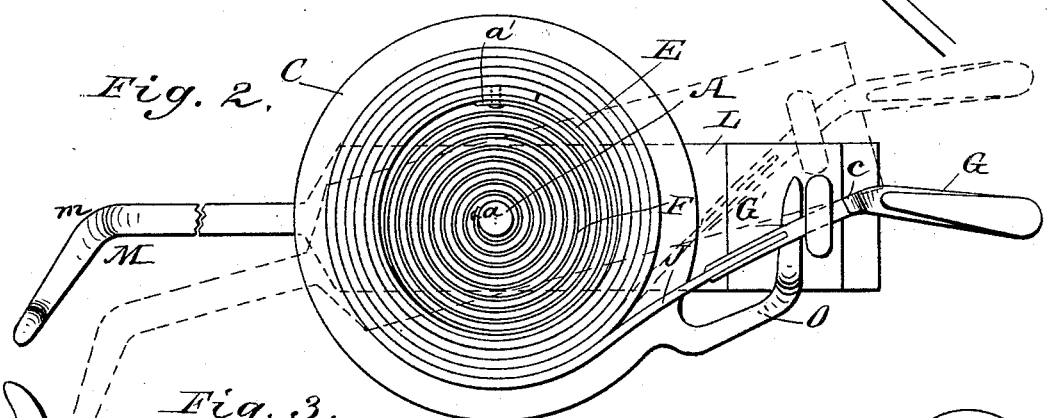
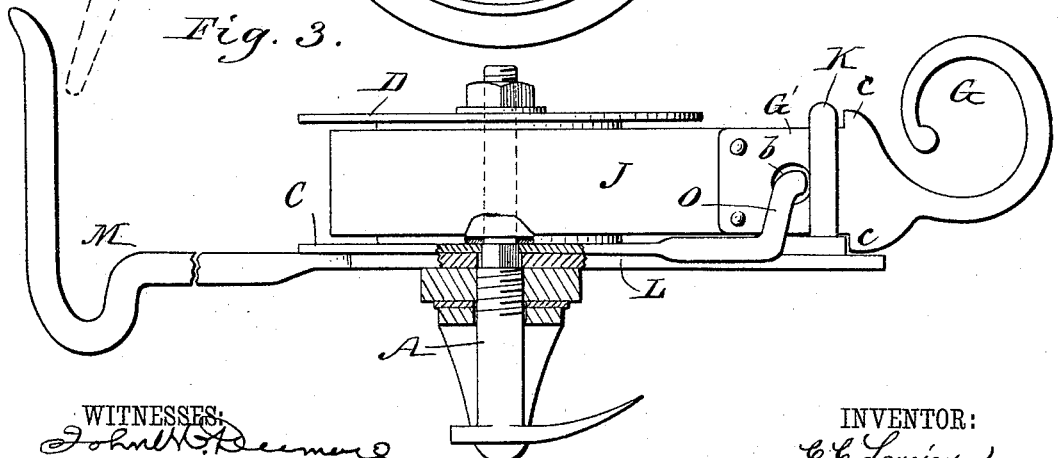
WITNESSES:
INVENTOR:
C. C. Lovejoy
BY Munn & Co.
ATTORNEYS.

United States Patent Office.

CLINTON C. LOVEJOY, OF BETHEL, MAINE.

CHECK-HOOK.

SPECIFICATION forming part of Letters Patent No. 390,380, dated October 2, 1888.

Application filed February 9, 1888. Serial No. 263,518. (No model.)

*To all whom it may concern:*

Be it known that I, CLINTON C. LOVEJOY, of Bethel, in the county of Oxford and State of Maine, have invented a new and Improved Check-Hook, of which the following is a full, clear, and exact description.

The object of my invention is to provide a practical harness check-hook constructed to enable the driver to easily check up and uncheck the horse without leaving the vehicle; and to this end my invention consists of a check-hook wherein the hook proper is connected to a spring of sufficient strength to return the checkrein, the hook being adapted to be retained by a suitable device connected to the frame of the hook, and also adapted, by means of a rear hook, to be thrown off from the said retaining device for unchecking the horse.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a perspective view of my new and improved check-hook applied to a gig-saddle, and showing the rein checked up and the line thrown over the rear hook in position for unchecking the horse. Fig. 2 is an enlarged plan view of the check-hook with the top plate or disk removed, and Fig. 3 is a broken side elevation of the check-hook.

My new check-hook may be secured by the bolt A to any form of saddle-tree or gig-saddle, B, and applied to any form of harness. Upon said bolt is secured the bottom plate or disk, C, formed or provided with the retaining-hook O and the top disk, D. Between the plates or disks C D is placed the barrel E, like the barrel to a clock-spring, which contains the coiled spring F, the inner end, $a$, of which is made fast to the bolt A, while the outer end, $a'$, is made fast to the barrel E, so that by turning the barrel a strong tension may be put upon the spring.

G represents the check-hook to receive the checkrein H, as shown in Fig. 1. This hook is connected to the rotating and spring-actuated barrel E by the strap J, and the end of the said hook is finished to form the plate G', slightly curved, as shown in Fig. 2, and formed with the orifice $b$ and shoulders $c$, which act as stops to prevent the hook from being drawn too far into the loop K by the action of the spring F. The said loop K is formed upon or secured to the front end of the plate L, which is fulcrumed upon rod A. The rear end of this plate is formed or provided with the hook M, which is by preference bent slightly downward and to one side, as shown at $m$, Fig. 1, so that the line N may be conveniently thrown over said hook, as illustrated in Fig. 1, and the plate L turned upon the bolt A by pulling slightly upon the line. This movement of the plate L will carry the loop K and check-hook G to one side, as indicated in dotted lines in Fig. 2, which movement will detach the plate G' of the hook from the retaining-hook O and thus permit the hook G to be drawn out of the loop K by a slight draft by the horse upon the check-hook H. This outward movement will be against the tension of the spring F, which serves to recheck the horse when his head is drawn up by the lines by drawing the check-hook and checkrein back, so that the plate G of the check-hook will engage again with the retaining-hook O.

Having thus fully described my invention, I claim as new and desire to secure by Letters Patent—

1. In a check-hook, the plate C, retaining-hook O, bolt A, and spring F, held upon the bolt, the check-hook connected to the spring by strap J and having aperture $b$, in combination with the plate L, loop K, and rear hook, M, substantially as described.

2. The plate C, formed with the retaining-hook O, the bolt A, top plate, D, barrel E, and spring F, in combination with the strap J, check-hook G, formed with the apertured plate G', and the plate L, formed with the loop K and rear hook, M, substantially as and for the purposes set forth.

CLINTON C. LOVEJOY.

Witnesses:
ADDISON E. HERRICK,
ELLERY C. PARK.